United States Patent [19]
Ha

[11] Patent Number: 5,948,084
[45] Date of Patent: Sep. 7, 1999

[54] SYSTEM FOR REMOTELY CONTROLLING A COMPUTER HAVING A USER INTERFACE SOFTWARE COMMUNICATING WITH A DEVICE DRIVER AND DRIVING AN APPLICATION SOFTWARE TO PERFORM OPERATION BASED ON A COMBINED KEY SIGNAL

[75] Inventor: Ho Jin Ha, Suwon, Rep. of Korea

[73] Assignee: SamSung Electronics Co., Ltd., Kyungki-do, Rep. of Korea

[21] Appl. No.: 08/910,561

[22] Filed: Aug. 20, 1997

[30] Foreign Application Priority Data

Aug. 20, 1996 [KR]  Rep. of Korea ............. 96/34537

[51] Int. Cl.$^6$ ............. G06F 13/12; G06F 13/22; G06F 13/24
[52] U.S. Cl. ............. 710/73; 710/46; 710/48; 710/67
[58] Field of Search ............. 180/167; 340/825.56, 340/825.69; 345/352; 348/734; 395/825, 885; 710/73, 46, 48, 67

[56] References Cited

U.S. PATENT DOCUMENTS 4,236,594  12/1980  Ramsperger ............. 180/167
4,746,919   5/1988  Reitmeier ............. 340/825.56
5,081,534   1/1992  Geiger et al. ............. 348/734
5,436,676   7/1995  Pint et al. ............. 348/734
5,598,523   1/1997  Fujita ............. 345/352
5,774,063   6/1998  Berry et al. ............. 340/825.69

Primary Examiner—Thomas C. Lee
Assistant Examiner—Ilwoo Park
Attorney, Agent, or Firm—Robert E. Bushnell, Esq.

[57] ABSTRACT

A device for remotely controlling a computer system operable in a graphic user interface environment. The remote control device comprises a micro-computer for converting a remote control signal transmitted from a remote control transmitter into a combined key signal and controlling the operation of the computer system in response to input data and command, a device driver for instructing an operation based on the combined key signal from the micro-computer and applying data and a command to the micro-computer if the combined key signal indicates the operation of the micro-computer, and a user interface software for performing bidirectional communication with the device driver and driving an application software corresponding to the combined key signal from the micro-computer to perform the operation based on the combined key signal. According to the present invention, a remote control function can always be stably performed, and can cope flexibly with variations in hardware and software environments. Further, the user can freely select a key signal combination to prevent a conflict with an application software.

10 Claims, 3 Drawing Sheets

SYSTEM FOR REMOTELY CONTROLLING A COMPUTER HAVING A USER INTERFACE SOFTWARE COMMUNICATING WITH A DEVICE DRIVER AND DRIVING AN APPLICATION SOFTWARE TO PERFORM OPERATION BASED ON A COMBINED KEY SIGNAL

CLAIM FOR PRIORITY

This application makes reference to, incorporates the same herein, and claims all benefits accruing under 35 U.S.C. § 119 from an application for DEVICE AND METHOD FOR REMOTELY CONTROLLING COMPUTER SYSTEM earlier filed in the Korean Industrial Property Office on the $20^{th}$ of Aug. 1996, and there duly assigned Ser. No. 34537/1996, a copy of which application is annexed hereto.

BACKGROUND OF THE INVENTION

1. Technical Field

The present invention relates to a device and a method for remotely controlling a computer system operable in a graphic user interface (GUI) environment.

2. Related Art

Generally, remote control of a variety of electronic equipments such as televisions, video cassette tape recorders (VCR), compact-disk (CD) players, cassette players, radios and other consumer electronic items has been extremely popular for allowing users to control the electronic equipments more conveniently from a remote distance.

Recently, remote control technique has been extended even to computer systems in which users are permitted to control operation of the computer systems remotely. A remote control receiver is connected to a micro-computer of the contemporary computer system to receive a remote control signal transmitted from a remote control transmitter in order to drive an application software for performing an intended function. In case where the remote control function is supported by existing application software, however, the remote control must communicate with a specific remote control firmware. For this reason, the existing firmware must be specific to the remote control function, or an application software must be changed whenever a communication module is changed. In addition, when an application software supports the remote control function without using an universal remote control interface, the application software must be configured in its entirety. Further, in case where the remote control function communicates directly with the micro-computer that is not different from a firmware, interfacing with other application software modules has been difficult, and the remote control function may not respond properly. That is, in contrast to a keyboard serving as an input unit of the computer system, the remote control function is operated only when an application software supporting the remote control function is driven. Furthermore, the implementation of remote control function is fixed to a combination of input keys on the keyboard. For this reason, in case where the combined input keys have already been used as hot keys for specific functions in application software, the remote control function supported by the application software may conflict with the specific functions.

SUMMARY OF THE INVENTION

Accordingly, it is therefore an object of the present invention to provide a device for remotely controlling a computer system and a process in which a remote control function can always and stably be performed.

It is another object to provide a device for remotely controlling a computer system and a process in which a remote control function can flexibly cope with variations in hardware and software environments.

It is still another object to provide a device for remotely controlling a computer system and a process in which a remote control function allows the user to freely select a key signal combination in order to prevent conflict with an application software.

These and other objects of the present invention can be achieved by a device for remotely controlling a computer system operable in a graphic user interface environment, which comprises a micro-computer for converting a remote control signal received from a remote control transmitter into a combined key signal and controlling the operation of the computer system in response to input data and command; a device driver for instructing an operation based on the combined key signal from the micro-computer and applying data and a command to the micro-computer if the combined key signal indicates the operation of the micro-computer; and a user interface software for performing bidirectional communication with the device driver and driving an application software corresponding to the combined key signal from the micro-computer to perform the operation based on the combined key signal.

In accordance with another aspect of the present invention, a method for remotely controlling a computer system operable in a graphic user interface environment including steps of discriminating a combined key signal on the basis of a remote control signal received from a remote control transmitter and informing an input of the combined key signal; checking a function of the combined key signal; transmitting data and a command to a micro-computer if the function of the combined key signal is associated with an operation of the micro-computer; informing a user interface software of the function of the combined key signal if the function is not associated with the operation of the micro-computer; and detecting an application software corresponding to the function of the combined key signal from previously registered data and driving the application software.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
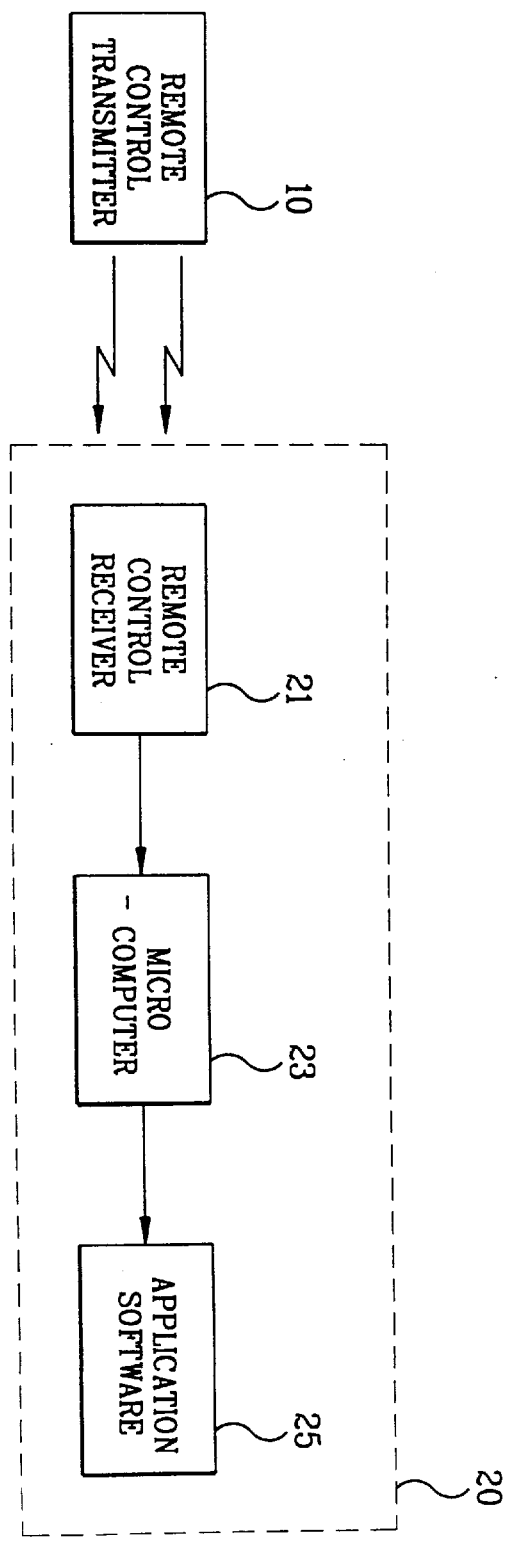
FIG. 1 illustrates a contemporary device for remotely controlling a computer system.

Referring now to the drawings and particularly to FIG. 1, which illustrates an example of a contemporary device for remotely controlling a computer system. The device includes a remote control transmitter 10 which remotely transmits a signal of a key operated by the user, and a computer system 20 which receives a remote control signal transmitted from the remote control transmitter 10 and is operated in response to the remote control signal.

Computer system 20 comprises a remote control receiver 21 for receiving the signal transmitted from the remote control transmitter 10, a micro-computer 23 for converting the signal received by the remote control receiver 21 into a key signal, and an application software 25 for performing a desired operation in response to the key signal from the micro-computer 23.

When a user pushes a desired key on the remote control transmitter 10 to remotely control the computer system 20, a corresponding key signal is transmitted by the remote control transmitter 10. Then, in the computer system 20, the signal transmitted by the remote control transmitter 10 is received by the remote control receiver 21 and applied to the micro-computer 23. The micro-computer 23 in turn discriminates the corresponding key signal on the basis of the signal received by the remote control receiver 21. Thereafter, the micro-computer 23 outputs a discriminated key signal to the application software 25 so that the corresponding operation can be performed by the application software 25.

Noticeably, the signal transmitted from the remote control transmitter 10 is a combined signal of at least two keys on a keyboard (not shown) which is a main input unit of the computer system 20. For example, assuming that the application software 25 is a program which receives a television broadcasting signal and a combination of keys on the keyboard for turning on or off reception of the television broadcasting signal is Ctrl+Alt+Q. When the user pushes an on/off key on the remote control transmitter 10, a combined key signal (Ctrl+Alt+Q) is transmitted from the remote control transmitter 10 to the computer system 20. The application program then turns on or off the reception of the television broadcasting signal in response to the combined key signal transmitted from the remote control transmitter 10.

As I have described earlier, however, in the case where the remote control function is supported by the existing application software, the remote control function must communicate with a specific remote control firmware. For this reason, the existing firmware must be specific to the remote control function, or an application software must be changed whenever a communication module is changed. In addition, when an application software supports the remote control function without using an universal remote control interface, the application software must be configured in its entirety. Further, in case where the remote control function communicates directly with the micro-computer that is not different from a firmware, interfacing with other application software modules has been difficult, and the remote control function may not respond properly. That is, in contrast to a keyboard serving as an input unit of the computer system, the remote control function is operated only when an application software supporting the remote control function is driven. Furthermore, the implementation of remote control function is fixed to a combination of input keys on the keyboard. For this reason, in case where the combined input keys have already been used as hot keys for specific functions in application software, the remote control function supported by the application software may conflict with the specific functions.

Figure 2:
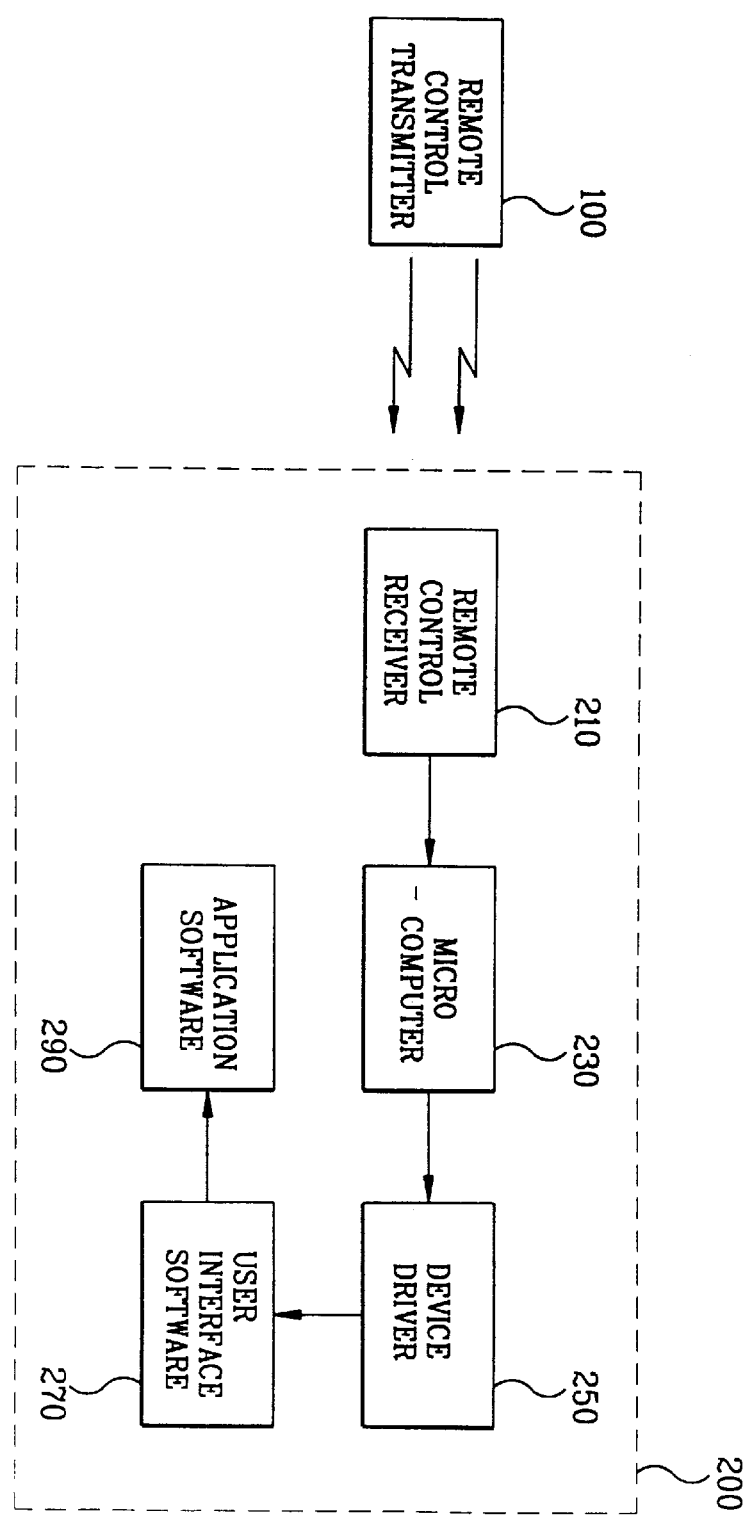
FIG. 2 illustrates a device for remotely controlling a computer system constructed according to the principles of the present invention.

Turning now to FIG. 2 which illustrates a device for remotely controlling a computer system constructed according to the principles of the present invention. As shown in FIG. 2, the device includes a remote control transmitter 100 which remotely transmits a signal of a key operated by the user, and a computer system 200 which receives a remote control signal transmitted from the remote control transmitter 100 and is operated in response to the remote control signal. The computer system 200 comprises a remote control receiver 210, a micro-computer 230, a device driver 250, a user interface software 270 and an application software 290.

The remote control receiver 210 is adapted to receive the signal transmitted from the remote control transmitter 100 and output the received signal to the micro-computer 230.

The micro-computer 230 is adapted to discriminate a combined key signal on the basis of the signal received by the remote control receiver 210, produce the combined key signal to the device driver 250 and control the operation of the computer system 200 according to a command and data from the device driver 250.

The device driver 250 is adapted to check the input of a remote control key signal from the remote control transmitter 100 in an interrupt or polling manner in a window environment and is always operated according to an operation program so that a remote control function can continuously be performed during the operation of the computer system 200. In addition, the device driver 250 performs bidirectional communication with the micro-computer 230 to directly receive and transmit commands and data from/to the micro-computer 230. Further, the device driver 250 transmits an operation command to the micro-computer 230 or receives the remote control key signal from the micro-computer 230 in a privileged mode such as, for example, Ring 0 of x86 series CPU available from Intel Company.

The user interface software 270 is adapted to perform bidirectional communication with the device driver 250. The user interface software 270 executes or stops an application software as needed. Further, the user interface software 270 provides a remote control extension function where combined keys can be changed according to a user's selection and a remote control change function where a specific application software can be replaced with a different application software.

The application software 290 is a function software of the computer system which is performed according to the operation of a key on the remote control transmitter 100.

The operation of the remote control device constructed according to the principles of the present invention will now be described in detail with reference to FIGS. 2 and 3 hereinbelow.

Figure 3:
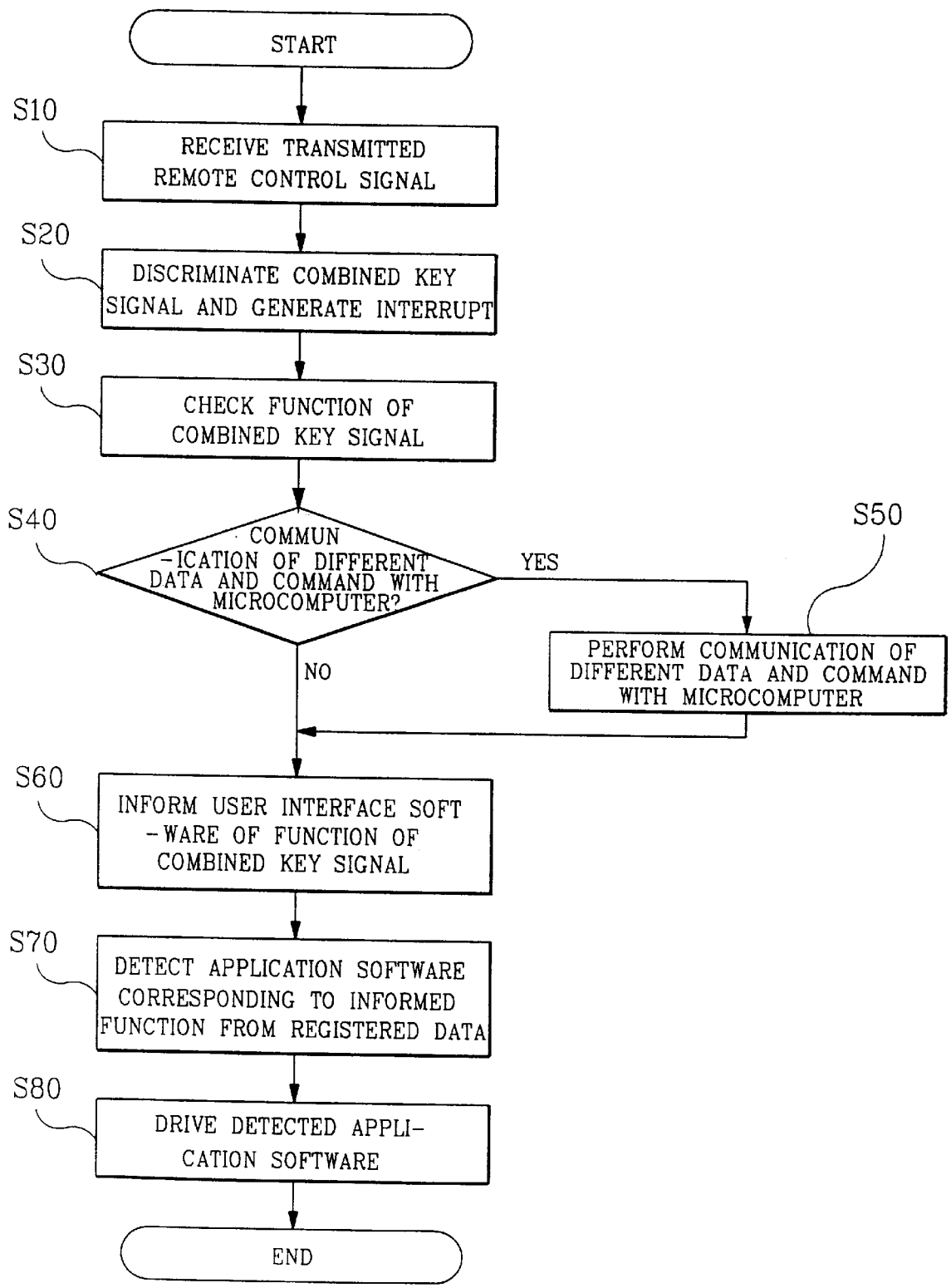
FIG. 3 is a flowchart of a control method for remotely controlling a computer system in accordance with the present invention.

Refer now to FIG. 3 which illustrates a method for remotely controlling the computer system 200 in accordance with the present invention. First, if the user pushes a desired key on the remote control transmitter 100, a corresponding key signal is transmitted by the remote control transmitter 100. The signal transmitted by the remote control transmitter 100 is received by the remote control receiver 210 and applied to the micro-computer 230 at step S10. At step S20, the micro-computer 230 discriminates a combined key signal on the basis of the signal received by the remote control receiver 21 and generates a remote control interrupt signal.

Upon receipt of the interrupt signal from the micro-computer 230, the device driver 250 checks a function of the combined key signal at step S30. Noticeably, the input of a remote control key signal is checked by the device driver 250 according to two methods. The first method is an interrupt method in which the device driver 250 checks a function of a combined key signal when the micro-computer 230 generates the interrupt signal. The second method is a polling method in which the device driver 250 checks the input of a signal from the remote control receiver 210 to the micro-computer 230 at an interval of predetermined time and then checks a function of a combined key signal if the signal from the remote control receiver 210 is input to the microcomputer 230.

After checking the function of the combined key signal at step S30, the device driver 250 determines whether to perform communication of different data and command with the micro-computer 230 at step S40. If it is determined that the device driver 250 must perform the communication of separate data and command with the micro-computer 230, the device driver 250 performs the corresponding operation at step S50. Then, at step S60, the device driver 250 informs the user interface software 270 of the function of the combined key signal to allow the user interface software 270 to perform that function.

If it is determined that the device driver 250 need not perform the communication of different data and command with the microcomputer 230 at step S40, however, the device driver 250 proceeds to step S60 directly to allow the user interface software 270 to perform the function of the combined signal.

At step S70, the user interface software 270 detects an application software 290 corresponding to the function informed by the device driver 250 from registered data in order to drive the detected application software to perform that function at step S80. At this time, if the detected application software 290 is being operated, it is stopped by a toggle key. Further, in the case where the pushed key on the remote control transmitter 100 is a function key for volume or channel adjustment, the user interface software 270 transfers the corresponding message to the application software 290.

Now, the function of the user interface software 270 will be described more in detail. If the user requests the user interface software 270 to allocate a specific combined key signal to a specific key on the remote control transmitter 100, the user interface software 270 requires the device driver 250 to change the current key corresponding to the specific combined key signal to the specific key. As a result, when the specific key on the remote control transmitter 100 is pushed, the device driver 250 determines that a function of the specific combined key signal has been selected. Further, in the case where the user requests the user interface software 270 to replace an application software 290 corresponding to a specific key on the remote control transmitter 100 with a different application software 290, the user interface software 270 registers a name of the application software 290 to be replaced. Then, when the operation regarding the specific key on the remote control transmitter 100 is required by the device driver 250, the user interface software 270 drives the replaced application software 290.

As apparent from the foregoing description, according to the present invention, the driver is provided in an extended form of operation system (OS) to communicate with the micro-computer which controls the computer system in the graphic user interface (GUI) environment in the firmware. Therefore, the remote control is enhanced in performance and extended in operational function.

While there have been illustrated and described what are considered to be preferred embodiments of the present invention it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A device for remotely controlling a computer system operable in a graphic user interface environment, comprising:

a micro-computer for converting a remote control signal into a combined key signal and controlling operation of said computer system in response to input data and command;

a device driver for instructing an operation based on the combined key signal from said micro-computer and applying data and command to said micro-computer, when the combined key signal indicates the operation of said micro-computer; and a user interface software for performing bidirectional communication with said device driver and driving an application software corresponding to the combined key signal from said micro-computer to perform the operation based on the combined key signal.

2. The device of claim 1, further comprised of said device driver operating in a privileged mode to perform bidirectional communication with the micro-computer for instructing said operation based on the combined key signal.

3. The device of claim 1, further comprised of said user interface software having a remote control extension function of changing combined keys according to a user's selection and a remote control change function of replacing a specific application software with a different application software.

4. A method for remotely controlling a computer system operable in a graphic user interface environment, comprising the steps of:

discriminating a combined key signal on the basis of a remote control signal and informing an input of the combined key signal;

checking a function of the combined key signal;

transmitting data and a command to a micro-computer, when the function of the combined key signal is associated with an operation of said micro-computer;

informing a user interface software of the function of the combined key signal, when the function of the combined key signal is not associated with the operation of said micro-computer; and detecting an application software corresponding to the function of the combined key signal from previously registered data and driving the detected application software.

5. The method of claim 4, further comprised of generating an interrupt to inform the put of the combined key signal in response to receipt of the remote control signal.

6. The method of claim 4, further comprised of determining the input of the remote control signal at an interval of predetermined time to inform the input of the combined key signal.

7. A device for remotely controlling a computer system operable in a graphic user interface environment, comprising:

a remote control transmitter having a plurality of discrete keys that are independently operable by manual depression to produce a remote control signal representing different remote control functions; and said computer system comprising:
- a remote control receiver disposed to receive the remote control signal transmitted from the remote control transmitter;
- a micro-controller electrically connected to said remote control receiver to control operation of said computer system in accordance with different remote control functions represented by the remote control signal, said micro-controller converting the remote control signal into a combined key signal;
- a device driver electrically connected to said micro-controller to check an intended function of the combined key signal; and
- a user interface software bidirectionally communicated with said device driver to drive an application software corresponding to the combined key signal from said micro-computer to perform the intended function based on the combined key signal.

8. The device of claim 7, further comprised of said device driver operating in a privileged mode to perform bidirectional communication with the micro-computer for performing the intended function based on the combined key signal.

9. The device of claim 7, further comprised of said user interface software having a remote control extension function of changing combined keys according to a user's selection and a remote control change function of replacing a specific application software with a different application software.

10. The device of claim 8, further comprised of said user interface software having a remote control extension function of changing combined keys according to a user's selection and a remote control change function of replacing a specific application software with a different application software.

* * * * *